Dec. 11, 1923.

L. G. McCLINTOCK

WELDING PROCESS AND PRODUCT 1,477,143

Filed May 1, 1922

INVENTOR
Lewis G. McClintock
BY
Edwards Sager & Bower
ATTORNEYS

Patented Dec. 11, 1923.

1,477,143

UNITED STATES PATENT OFFICE.

LEWIS G. McCLINTOCK, OF PITTSBURGH, PENNSYLVANIA, ASSIGNOR TO PITTSBURGH TRANSFORMER COMPANY, A CORPORATION OF PENNSYLVANIA.

WELDING PROCESS AND PRODUCT.

Application filed May 1, 1922. Serial No. 557,512.

*To all whom it may concern:*

Be it known that I, LEWIS G. MCCLINTOCK, a citizen of the United States, residing at Pittsburgh, in the county of Allegheny and State of Pennsylvania, have invented certain new and useful Improvements in Welding Processes and Products, of which the following is a specification.

This invention relates to welding and particularly to the welding of a bushing or frame in place in a sheet or plate. In many sheet or plate metal structures and particularly in sheet steel tanks for transformers it is desirable to provide access to the interior by an opening around which is a bushing or frame carrying a removable cover for the opening. Such a frame is usually welded in position in the opening in the sheet and difficulty has hitherto been experienced in providing a strong smooth weld and in preventing the sheet from bending out of shape due to the localized heat of the welding operation.

The object of this invention is to overcome the objections to these prior processes and provide a construction in which the weld will be easily made and smoothly finished without bending or buckling of the sheet or weakening the joint in any way.

In the accompanying drawings illustrating the invention—

Figure 1:
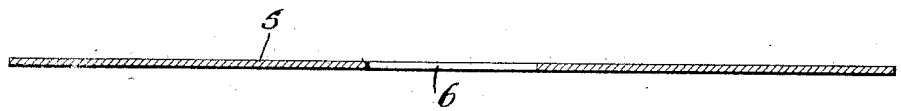
Figure 2:
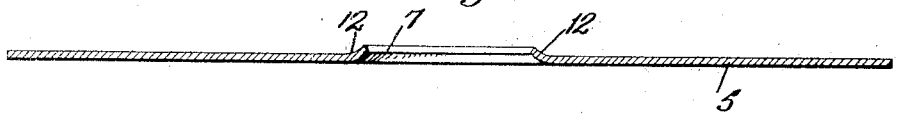
Figure 3:
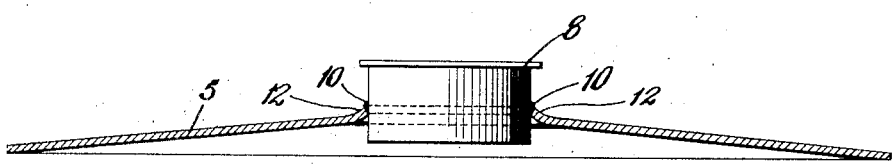

Figs. 1, 2 and 3 are sectional views illustrating successive steps in the formation and welding of the parts.

In the specific embodiment of the invention shown in the drawings a steel sheet or plate 5, which is the top of a transformer tank, has an opening 6 through it as indicated in Fig. 1. Before the bushing or frame (Fig. 3) is inserted in this opening its edges 7 are turned or flanged upward as shown in Fig. 2, the metal being bent at 12 on smooth lines without abrupt corners or ridges. This flanged opening is sized to fit the inner bushing or frame 8 which is inserted to the desired depth in the opening. Between the frame and the edges 7 are upwardly opening V-shaped grooves along which a strong smooth weld may be readily made as indicated at 10 (Fig. 3).

The upward flanging of the edges of the opening not only positions these edges most advantageously for welding but also protects the sheet as a whole against bending or buckling by the heat of the welding operation because any local expansion at the welding area simply causes a flexure of the curved portion 12 around the weld and does not stress the sheet as a whole so as to bend it.

The resulting product is strong with gentle symmetrical curves between the inserted frame and the metal plate. Sharp corners between the parts are avoided and the resulting smooth inclined surfaces naturally shed rain and moisture and avoid corrosion.

I claim:—

A cover comprising the combination with a metal sheet having an opening with the metal around the opening turned upward as a flange inclined toward the apex of a cone, of a member in said opening, the side of said member and the end surface of said flange forming a V-shaped groove, and a weld in said groove between said member and said flange.

LEWIS G. McCLINTOCK.